(12) United States Patent
Ohtsuka et al.

(10) Patent No.: US 8,180,526 B2
(45) Date of Patent: May 15, 2012

(54) EQUIPMENT FOR VEHICLE AND COMMUNICATION INTERFACE CIRCUIT FOR USE IN THIS EQUIPMENT

(75) Inventors: Yasunori Ohtsuka, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 965 days.

(21) Appl. No.: 12/223,112

(22) PCT Filed: Nov. 17, 2006

(86) PCT No.: PCT/JP2006/323003
§ 371 (c)(1),
(2), (4) Date: Jul. 23, 2008

(87) PCT Pub. No.: WO2007/094106
PCT Pub. Date: Aug. 23, 2007

(65) Prior Publication Data
US 2010/0228433 A1    Sep. 9, 2010

(30) Foreign Application Priority Data

Feb. 17, 2006 (JP) .................................. 2006-041293

(51) Int. Cl.
*H02M 1/14* (2006.01)
(52) U.S. Cl. ............. 701/36; 701/29.1; 363/39; 363/45; 363/46; 361/1; 361/10; 361/23
(58) Field of Classification Search ............. 318/400.24, 318/96, 98–100; 363/45, 46; 701/29, 36
See application file for complete search history.

(56) References Cited

U.S. PATENT DOCUMENTS

| 4,716,584 | A | | 12/1987 | Fujisaki |
| 4,797,582 | A | | 1/1989 | Nguyen et al. |
| 5,432,817 | A | | 7/1995 | Hormel et al. |
| 5,481,163 | A | * | 1/1996 | Nakamura et al. ............ 315/308 |
| 5,656,922 | A | * | 8/1997 | LaVelle et al. .................. 322/46 |
| 5,998,929 | A | * | 12/1999 | Bechtel et al. .................. 315/82 |
| 6,281,638 | B1 | * | 8/2001 | Moisin .......................... 315/244 |
| 6,288,881 | B1 | * | 9/2001 | Melvin et al. ................... 361/18 |
| 6,396,282 | B1 | | 5/2002 | Minuth et al. |
| 6,400,181 | B1 | * | 6/2002 | Joch ............................... 326/75 |
| 6,615,301 | B1 | * | 9/2003 | Lee et al. ...................... 710/106 |

(Continued)

FOREIGN PATENT DOCUMENTS

DE                19807393 C1      6/1999

(Continued)

*Primary Examiner* — Jonathan M Dager
(74) *Attorney, Agent, or Firm* — Birch, Stewart, Kolasch & Birch, LLP (57) ABSTRACT

Equipment for vehicle in accordance with the present invention includes: a vehicle-mounted unit which runs with respect to a vehicle body ground on a side of a negative electrode of a battery; an impedance component having an end connected to the vehicle body ground, and another end connected to a circuit ground; a circuit to be controlled which runs with respect to the circuit ground; a control unit which runs with respect to the circuit ground, for controlling the circuit to be controlled and for outputting a communication signal in a digital form which is to be transmitted to the vehicle-mounted unit; and a communication interface circuit which runs with respect to both the vehicle body ground and the circuit ground, for cancelling a potential difference between the vehicle body ground and the circuit ground, and for carrying out bidirectional communications between the vehicle-mounted unit and the control unit.

5 Claims, 2 Drawing Sheets

U.S. PATENT DOCUMENTS

| | | | |
|---|---|---|---|
| 7,046,494 B2 * | 5/2006 | Ball | 361/93.1 |
| 8,031,450 B2 * | 10/2011 | Nakahara | 361/91.1 |
| 2002/0017873 A1 * | 2/2002 | Rabine | 315/76 |
| 2003/0030394 A1 * | 2/2003 | Majumdar et al. | 318/362 |
| 2003/0039130 A1 * | 2/2003 | Curtiss | 363/37 |
| 2004/0130326 A1 * | 7/2004 | Yamamoto | 324/503 |
| 2005/0200287 A1 | 9/2005 | Ito et al. | |
| 2007/0103284 A1 * | 5/2007 | Chew et al. | 340/438 |

FOREIGN PATENT DOCUMENTS

| | | |
|---|---|---|
| EP | 0457595 A1 | 11/1991 |
| EP | 10258315 A1 | 6/2004 |
| JP | 2-28109 U | 2/1990 |
| JP | 10-501662 A | 2/1998 |
| JP | 2003-154903 A | 5/2003 |

\* cited by examiner

EQUIPMENT FOR VEHICLE AND COMMUNICATION INTERFACE CIRCUIT FOR USE IN THIS EQUIPMENT

FIELD OF THE INVENTION

The present invention relates to equipment for vehicle which has a vehicle body ground (GND) and a circuit ground, and which carries out bidirectional communications between a vehicle-mounted unit disposed on a side of the vehicle body ground and a circuit disposed on a side of the circuit ground using a digital signal, and a communication interface circuit which uses the equipment for vehicle.

BACKGROUND OF THE INVENTION

A structure of transmitting a signal via communications between one piece of equipment and another piece of equipment which are mounted in a vehicle has been put in practical use, and many technologies about this structure have been also disclosed. As a conventional example of this structure, there is the following one.

This conventional example relates to equipment for vehicle which uses a micro computer (referred to as a "microcomputer" from here on) as a control unit for transmitting a signal to the other piece of vehicle-mounted equipment, and is characterized in that, in the equipment including a load which generates a large ripple current when a load current is alternately made to pass therethrough and prevented from passing therethrough, a switching element for performing an on/off drive controlling operation on the above-mentioned load according to an output signal from the above-mentioned microcomputer so as to make the load current pass through the load or prevent the load current from passing through the load, and a filter (choke coil) disposed between a low voltage terminal (which is a "circuit ground") of the above-mentioned switching element, and a vehicle body ground, for reducing the ripple current so that, as a noise, the above-mentioned ripple current does not have a bad influence on the other piece of equipment, such as a radio, in order to eliminate the influence of a potential difference which occurs between the above-mentioned microcomputer (the vehicle body ground side) and the switching element (the circuit ground side) due to a voltage drop which occurs because of a large current flowing into the filter, a photo coupler is disposed between the microcomputer and the switching element as a signal transmission interface of insulated type which does not transmit any electric noise and the potential difference (for example, refer to patent reference 1).

In the above-mentioned conventional example, if the filter for reducing the ripple current is placed not on the side of the above-mentioned ground, but on the side of a positive power supply having a high potential, the low voltage terminal of the switching element can be connected directly to the vehicle body ground, i.e., the ground of the microcomputer, and the influence of the voltage drop as mentioned above (the potential difference) which occurs in the filter can be eliminated and therefore it becomes unnecessary to dare to use the photo coupler.

However, there is a case in which in order to suppress the occurrence of noise, the filter has to be disposed on the side of the ground, as mentioned above, and, in this case, the above-mentioned conventional example is needed in order to dare to place the filter on the side of the ground.

Furthermore, as an example having the same arrangement as that of the above-mentioned conventional example, except for the above-mentioned filter, there is an example in which a resistor for current detection is arranged between a switching element, which is controlled by a microcomputer, and a vehicle body ground. Also in this case in which the resistor for current detection is added, a potential difference occurs in the same way as mentioned above, and therefore the structure of the above-mentioned conventional example in which a photo coupler is disposed in order to eliminate the influence of the potential difference may be needed.

Furthermore, in order to prevent vehicle-mounted equipment from being destroyed when an abnormal condition like a reversal of the polarity of a battery power source (a reverse connection) occurs in an operating environment peculiar to the vehicle-mounted equipment, a diode for preventing a reverse current from flowing through the battery power source can be arranged in series with this battery power source. In this case, if the diode is placed on the side of the positive end of the battery power source, no voltage drop (no potential difference) occurs, unlike in the case of the above-mentioned conventional example. Furthermore, from the viewpoint of the structure of the diode, a frame to which the chip is mounted serves as the cathode of the diode in many cases, a direct connection of a case which can use, as a heat sink, the frame with a means of securing this frame thereto or soldering this frame thereto as a surface mounting component to the vehicle body ground eliminates the necessity of an electric insulating plate and so on, and the thermal resistance of a radiation path can be reduced. As a result, because heat generation of the diode element can be suppressed, this structure is convenient particularly to a diode through which a large amount of current passes and this result in heat generation and a high temperature. Thus, the structure of the above-mentioned conventional example can be an effective means for the case in which a diode is placed on the side of the vehicle body ground.

Furthermore, in equipment which allows a large amount of current to pass therethrough, because a diode which prevents a reverse current from passing through a battery power source at the time when a reverse connection of the battery power source is established has a voltage drop in the forward direction even under normal use, a loss caused by the diode, i.e., heat generation cannot be disregarded. In such a case, it is general to use a method of disposing an FET (field-effect transistor) instead of the diode, turning on this FET under normal use, and turning off the FET at the time when a reverse connection of the battery power source is established. In many cases, the FET having a low on resistance which is required in order to reduce the voltage drop at the time when the FET is turned on is of N-ch type. Furthermore, because FETs of N-ch type are cheap, this N-ch type of FET is used instead of the diode in many cases. Also in the case of using this N-ch type of FET, because a frame serves as the cathode (i.e., the drain of the FET) of a parasitic diode which the FET chip, like in the case of the above-mentioned diode, the FET of N-ch type is placed on the side of the vehicle body ground, too, and a direct connection of the frame to the vehicle body ground eliminates the necessity of an electric insulating plate and is convenient. In many examples, an FET of N-ch type is thus used.

As previously explained, the above-mentioned conventional example is effective for the case in which one of various elements of the various purposes, such as the filter (choke coil) and diode, is disposed between the switching element on the side of the circuit ground and the vehicle body ground.

Furthermore, in a case in which a microcomputer controls one load which allows a large current to pass therethrough by using one photo coupler while communicating with other vehicle-mounted equipment, as in the case of the above-mentioned example, if communication lines connected between the microcomputer and the other vehicle-mounted equipment consist of a transmission line and two reception lines via which a signal from this transmission line is received, i.e., if there is a one-to-one correspondence between the microcomputer and an object to be controlled, placement of a potential at which the microcomputer is mounted on the side of the vehicle body makes it possible to construct the circuit using one interface circuit such as a photo coupler, and is convenient.

[Patent reference 1] JP, 2003-154903,A

The conventional equipment for vehicle (patent reference 1) is constructed as mentioned above, eliminates the influence of the potential difference which occurs between the vehicle body ground side and the circuit ground side, which occurs when a large current flows into the filter for noise suppression, with a signal transmission interface which consists of a photo coupler, and carries out signal communications from the microcomputer to the switching element. Furthermore, the structure of conventional equipment for vehicle (patent reference 1) is not limited to a filter (a choke coil), and can also be applied to and effective for a case in which one of various elements of various purposes, such as a resistor for current detection, and a diode or FET for protection of reverse connection a battery power source, is placed between the circuit ground and the vehicle body ground.

However, because the above-mentioned conventional equipment for vehicle uses a photo coupler as a signal transmission interface, there is a one-to-one correspondence between the microcomputer and the object to be controlled.

In contrast to this, there is a case in which the microcomputer controls many loads (a plurality of loads) and so on as objects to be controlled. In this case, there is a one-to-many correspondence between the microcomputer and the objects to be controlled. When photo couplers are used for this structure in which here is a one-to-many correspondence between the microcomputer and the objects to be controlled, it is necessary to dispose a photo coupler for each of the objects to be controlled, and therefore the component count increases and the size of the equipment increases. As a result, there arises a problem that the cost of the equipment increases and this results in occurrence of an undesired situation.

Furthermore, because in general, communications for use in vehicle-mounted equipment are bidirectional communications in which transmission and reception are carried out via one communication line, there is another problem that only the structure of the above-mentioned conventional example which uses photo couplers cannot support such bidirectional communications, it is necessary to add other parts, and, as a result, the circuit structure becomes complicated and therefore it is not practical to use photo couplers.

BRIEF SUMMARY OF THE INVENTION

The present invention is made in order to solve the above-mentioned problems, and it is therefore an object of the present invention to provide equipment for vehicle which eliminates the influence of a voltage drop (a potential difference) which occurs in an impedance component placed between a vehicle body ground and a circuit ground, and which carries out bidirectional communications using a digital signal between a vehicle-mounted unit disposed on a side of the vehicle body ground and a circuit disposed on a side of the circuit ground with a downsized low-cost structure, and a communication interface circuit which uses the equipment for vehicle.

Equipment for vehicle in accordance with the present invention includes: a vehicle-mounted unit which runs with respect to a vehicle body ground on a side of a negative electrode of a battery power source, for transmitting and receiving a communication signal in a digital form; an impedance component having an end which is connected to the above-mentioned vehicle body ground, and another end which is connected to a circuit ground; a circuit to be controlled which runs with respect to the above-mentioned circuit ground; a control unit which runs with respect to the above-mentioned circuit ground, for controlling the above-mentioned circuit to be controlled, and for outputting a communication signal in a digital form which is to be transmitted to the above-mentioned vehicle-mounted unit; and a communication interface circuit which runs with respect to both the above-mentioned vehicle body ground and the above-mentioned circuit ground, for cancelling a potential difference which occurs between the above-mentioned vehicle body ground and the above-mentioned circuit ground due to the above-mentioned impedance component, and for carrying out bidirectional communications between the above-mentioned vehicle-mounted unit and the above-mentioned control unit.

As mentioned above, in accordance with the present invention, the control unit is placed on the side of the object to be controlled which runs with reference to the circuit ground and directly controls the object to be controlled, and the communication interface circuit is placed between the above-mentioned control unit and the vehicle-mounted unit which runs with reference to the vehicle body ground, and is so constructed as to carry out bidirectional communications between the above-mentioned vehicle-mounted unit and the above-mentioned control unit in such a way that the potential difference which occurs between the vehicle body ground and the circuit ground due to the impedance component is cancelled. Therefore, in a case in which the control unit controls a plurality of objects to be controlled, the number of components included in the communication interface circuit can be reduced, and this results in downsizing and cost reduction of the equipment for vehicle. Furthermore, the communication interface circuit having a small number of components can absorb the influence of the potential difference which occurs between the above-mentioned vehicle body ground and the above-mentioned circuit ground, and can carry out bidirectional communications by way of the single communication line.

BRIEF DESCRIPTION OF THE FIGURES

FIG. 3 is an explanatory drawing showing a hysteresis function, and FIG. 3 (a) is a diagram showing a timing relation between a communication signal inputted to a comparator and a communication signal outputted from the comparator and FIG. 3(b) is a diagram of hysteresis characteristics.

DETAILED DESCRIPTION OF THE INVENTION

Hereafter, in order to explain this invention in greater detail, the preferred embodiments of the present invention will be described with reference to the accompanying drawings.

Embodiment 1

Figure 1:
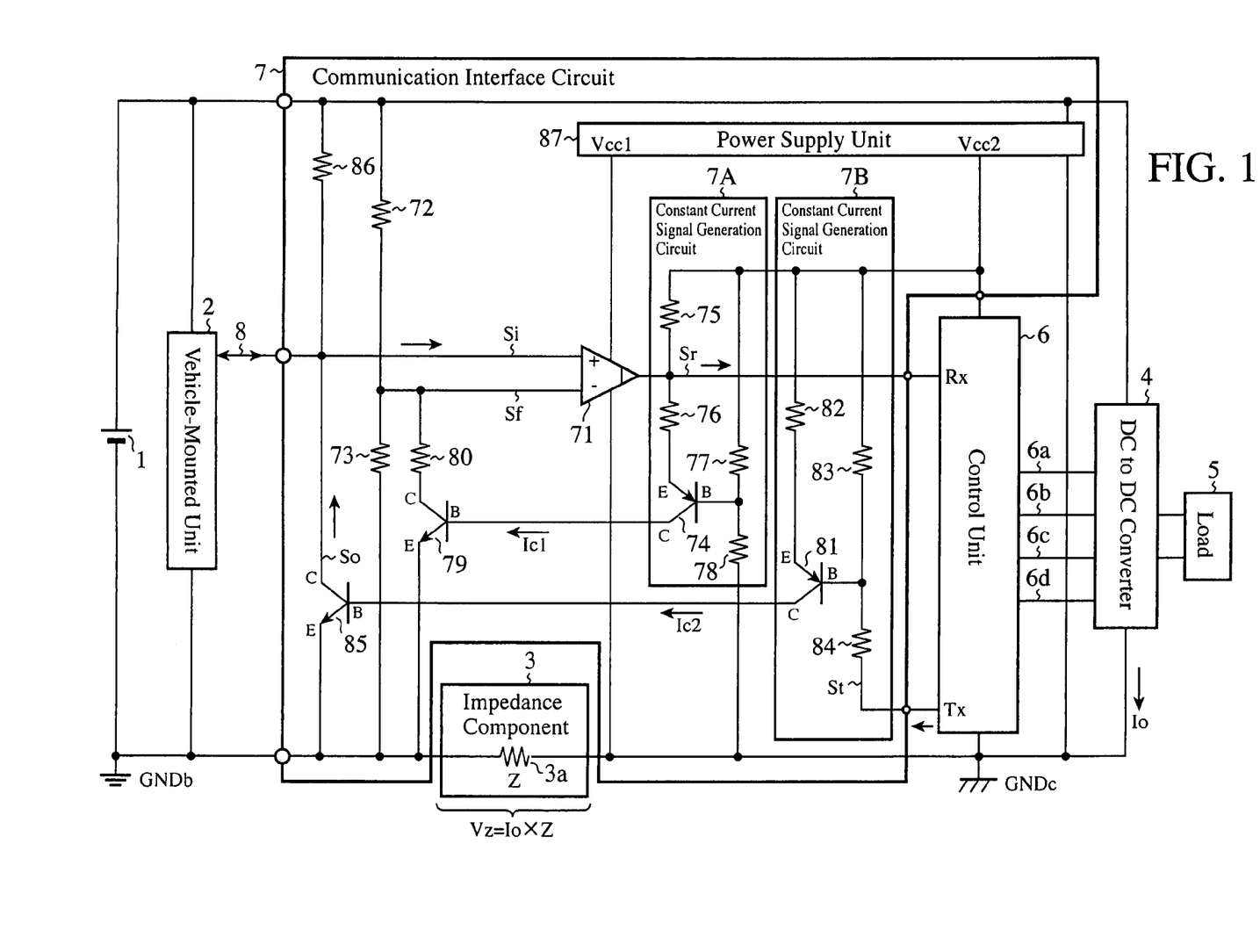
FIG. 1 is a circuit diagram of the structure of equipment for vehicle in accordance with Embodiment 1 of the present invention.

FIG. 1 is a circuit diagram of the structure of equipment for vehicle in accordance with Embodiment 1 of the present invention.

As shown in FIG. 1, this equipment for vehicle is roughly comprised of a battery power source 1, a vehicle-mounted unit 2, an impedance component 3, a direct current/direction current converter 4 (referred to as a "DC to DC converter" from here on), a load 5, a control unit 6, and a communication interface circuit 7.

In the above-mentioned structure, the battery power source 1 supplies a power supply to each of the circuits, and has a negative electrode connected to a vehicle body ground GNDb.

The vehicle-mounted unit 2 runs with reference to the vehicle body ground GNDb, and transmits and receives communication signals, such as a control signal in a digital form.

The impedance component 3 is formed of an element depending upon the purpose of use of the equipment for vehicle. FIG. 1 shows a case in which, for example, a resistor 3a for current detection is disposed as the impedance component, and other examples of the impedance component are shown in FIG. 2.

Figure 2:
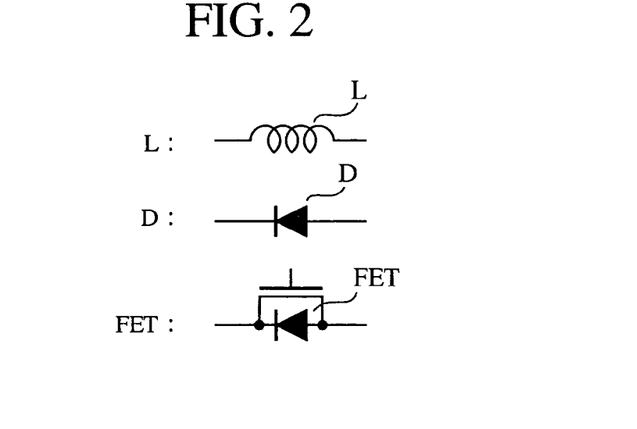
FIG. 2 is a diagram showing a concrete example of an impedance component.

FIG. 2 is a diagram showing the other concrete examples of the impedance component 3.

As shown in FIG. 2, the other concrete examples of the impedance components 3 other than the resistor 3a include, for example, an inductance (L) as a filter coil used for noise reduction, and a diode (D) or an FET used for protection against reverse connection of the battery power source 1.

As shown in FIG. 1, the impedance component 3 used for various purposes as mentioned above is disposed in such a way that one end thereof is connected to the vehicle body ground GNDb and the other end thereof is connected to the circuit ground GNDc. The reason why the impedance component 3 is thus disposed on the side of the GND is that, as mentioned above, in a case in which the impedance component 3 is a diode (D) or an FET, there is no necessity to provide an electric insulating plate used for mounting the element, and so on, and the thermal resistance of the heat radiation path can be reduced and this results in the heat generation of the element being easily reduced.

Furthermore, in a case in which the impedance component consists of another element, the reason why the impedance component is disposed on the side of the GND is that the impedance component has to be disposed on the side of the vehicle body ground in order to accomplish the objective.

The DC to DC converter 4 runs with reference to the circuit ground GNDc on the side of the other end of the impedance component 3, and converts the direct current voltage supplied from the battery power source 1 into a direct current voltage having a predetermined voltage value.

The load 5 is, for example, a vehicle-mounted head lamp, and operates from the electrical power supplied from the DC to DC converter 4 which runs with reference to the circuit ground GNDc.

Both the above-mentioned DC to DC converter 4 and the above-mentioned load 5 are circuits to be controlled.

The control unit 6 runs with reference to the circuit ground GNDc, and controls the DC to DC converter 4 which is a circuit to be controlled according to a communication signal transmitted from the vehicle-mounted unit 2 via the communication interface circuit 7 which will be explained hereafter so as to control the load 5. Furthermore, a communication signal in a digital form which is, for example, a signal indicating the state of the control is transmitted to the vehicle-mounted unit 2 via the communication interface circuit 7. This control unit 6 consists of, for example, a microcomputer.

The communication interface circuit 7 runs with reference to both the vehicle body ground GNDb and the circuit ground GNDc, and carries out bidirectional communications of communication signals between the vehicle-mounted unit 2 and the control unit 6. The communication interface circuit carries out the communications in such away as to cancel a potential difference which occurs between the vehicle body ground GNDb and the circuit ground GNDc which results from a flow of a current Io which flows through the DC to DC converter 4, which is a circuit to be controlled, into the impedance component 3.

This communication interface circuit 7 is comprised of a comparator (comparator) 71, a first constant current signal generation circuit 7A, a hysteresis circuit including a transistor 79 and so on, a second constant current signal generation circuit 7B, a signal output circuit including a transistor 85 and so on, and a power supply unit 87.

In the above-mentioned structure, the comparator 71 receives electrical power applied thereto from the below-mentioned power supply unit 87 and runs with reference to the circuit ground GNDc, and a control signal Si in a digital form which is generated with reference to the vehicle body ground GNDb is inputted from the vehicle-mounted unit 2 to a noninverting input terminal (+) of the comparator. Furthermore, a comparison reference signal Sf generated with reference to the vehicle body ground GNDb which is used for determining whether the control signal Si has a high (H) level or a low (L) level is set and inputted to an inverting input terminal (−) of the comparator, and a control signal Sr in a digital form which is based on this level determination is transmitted to a receiving terminal (Rx) of the control unit 6. The comparison reference signal Sf is set up by both resistors 72 and 73 which divides the direct current voltage between the battery power source 1 (a positive electrode) and the vehicle body ground GNDb (a negative electrode), and the below-mentioned hysteresis circuit which runs with reference to the vehicle body ground GNDb.

The first constant current signal generation circuit 7A is formed of a transistor 74 of PNP type and resistors 75, 76, 77, and 78, and runs with reference to the circuit ground GNDc. This first constant current signal generation circuit 7A makes a constant current signal Ic1 flow through the collector (C) of the transistor 74.

The hysteresis circuit is formed of a transistor 79 of NPN type and a resistor 80, and runs with reference to the vehicle body ground GNDb. This hysteresis circuit receives the constant current signal Ic1 from the first constant current signal generation circuit 7A formed of the transistor 74 and so on at the base (B) of the transistor 79, runs from the constant current signal, and changes the level of the comparison reference signal Sf which is set to the comparator 71.

The second constant current signal generation circuit 7B is formed of a transistor 81 of PNP type and resistors 82, 83, and 84, and runs with reference to the circuit ground GNDc. This second constant current signal generation circuit 7B generates and makes a constant current signal Ic2 flow through the collector (C) of the transistor 81.

The signal output circuit is formed of the transistor 85 of NPN type and a resistor 86, and runs with reference to the vehicle body ground GNDb. This signal output circuit receives the constant current signal $1c2$ from the second constant current signal generation circuit 7B which is formed of the transistor 81 and so on at the base (B) of the transistor 85, runs from the constant current signal, and transmits a communication signal St outputted from the transmitting end (Tx)

of the control unit 6 to the vehicle-mounted unit 2. The resistor 86 also serves to set an operating voltage to the noninverting input terminal (+) of the comparator 71.

The power supply unit 87 generates power supplies Vcc1 and Vcc2 for circuits which run from a direct current on the basis of the direct current voltage from the battery power source 1, and supplies the electrical power supplies to the above-mentioned comparator 71, the above-mentioned first constant current signal generation circuit 7A including the transistor 74 and so on, the above-mentioned second constant current signal generation circuit 7B including the transistor 81 and so on, and the above-mentioned control unit 6. The power supplies Vcc1 and Vcc2 for circuits which are generated by this power supply unit 87 have voltages with reference to the circuit ground GNDc.

Next, a background to the structure of FIG. 1 will be explained.

In a case in which the use of a photo coupler as described in the above-mentioned conventional example (patent reference 1) is applied to a structure in which the impedance component 3 is disposed on the side of the ground (GND), and the control unit 6 controls a plurality of objects to be controlled, it is necessary to dispose a photo coupler for each of the plurality of objects to be controlled because there is a one-to-many correspondence between the control unit 6 and the plurality of objects to be controlled, and therefore there is a problem that the component count increases, as previously explained.

As an example of the structure in which the control unit 6 controls a plurality of objects to be controlled as mentioned above, there can be provided a discharge lamp lighting apparatus which makes HID bulbs (high intensity discharge lamps), which are used as vehicle-mounted head lamps, light up. This apparatus is provided with an FET, as the impedance component 3, disposed on the side of the ground (GND) for protection against reverse connection of the battery power source 1.

Hereafter, a case in which a discharge lamp lighting apparatus mentioned above as an example is applied to the structure of FIG. 1 will be explained.

In the discharge lamp lighting apparatus mentioned above as an example, there are signals which are connected to the control unit 6 as follows.

As a signal which belongs to the side of the vehicle body ground GNDb which is on the side of one end of the impedance component 3 (FET) for protection against reverse connection of the battery power source, there is a signal on the communication line 8.

As signals which belong to the side of the circuit ground GNDc (i.e., the side of the objects to be controlled) which is on the side of the other end of the impedance component 3 (FET), there are the following signals (1) to (4):

(1) an input signal for measurement of the output voltage and the output current in order to monitor the state of the HID bulbs;

(2) an output signal for control of the DC to DC converter 4 in order to output appropriate power to the HID bulbs;

(3) an output signal for polarity switching in order to make the HID bulbs light up with AC; and (4) an output signal for activating/deactivating the DC to DC converter 4 in order to make the HID bulbs light up/go out at an appropriate timing.

The signal lines respectively corresponding to the four signals (1) to (4) are signal lines 6a to 6d which are connected between the control unit 6 and the DC to DC converter 4 which is an object to be controlled which are shown in FIG. 1.

In contrast, the number of communication lines 8 connected between the vehicle-mounted unit 2 and the control unit 6 is typically one, and therefore this number of lines which are connected between the vehicle-mounted unit 2 and the control unit 6 is much smaller than the number of lines which are connected between the control unit 6 and the DC to DC converter 4.

Therefore, in the case in which the control unit 6 controls the plurality of objects to be controlled in the equipment, the control unit 6 is arranged on the controlled side (i.e., the side of the DC to DC converter 4) which runs with reference to the circuit ground GNDc, and the control unit 6 is connected directly to the objects to be controlled having a large number of connections. As a result, the control unit 6 runs with reference to the circuit ground GNDc.

As mentioned above, because the control unit 6 is placed on the controlled side, the communication interface circuit 7 is arranged between the communication line 8 of the vehicle-mounted unit 2 which transmits and receives a signal which is generated with reference to the vehicle body ground GNDb, and the control unit 6 which is directly connected to the objects to be controlled on the side of the circuit ground GNDc, and bidirectional communications are carried out between the vehicle-mounted unit 2 and the control unit 6 in such a way that the potential difference which occurs between the vehicle body ground GNDb and the circuit ground GNDc due to the impedance component 3 is cancelled, the number of components included in the communication interface circuit 7 can be reduced and downsized and low-cost desirable vehicle-mounted equipment (e.g., a discharge lamp lighting apparatus which is mentioned above as an example) can be implemented.

Next, the operation of the equipment for vehicle shown in FIG. 1 will be explained.

Transmission of a signal from the vehicle-mounted unit 2 to the control unit 6 will be explained first.

The communication signal Si in a digital form which is outputted from the vehicle-mounted unit 2 which runs with reference to the vehicle body ground GNDb is inputted, via the communication line 8, to the noninverting input terminal (+) of the comparator 71 which runs from the power supply Vcc1 for circuits from the power supply unit 87 which is generated with reference to the circuit ground GNDc. The comparison reference signal Sf is set to the inverting input terminal (−) of this comparator 71 by the hysteresis circuit which is formed of the voltage dividing resistors 72 and 73, the transistor 79 and so on which run with reference to the vehicle body ground GNDb, and which thus runs with reference to the vehicle body ground GNDb.

The above-mentioned communication signal Si and the above-mentioned comparison reference signal Sf are generated with reference to the vehicle body ground GNDb. The comparator compares the communication signal Si inputted to the noninverting input terminal (+) thereof with the comparison reference signal Sf so as to determine whether the communication signal Si has a high (H) level or a low (L) level. The comparator 71 outputs the communication signal Sr in a digital form which is based on this level determination, and this communication signal Sr is then transmitted to the receiving terminal (Rx) of the control unit 6. This communication signal Sr is the one with reference to the circuit ground GNDc. Furthermore, the control unit 6 runs from the power supply Vcc2 for circuits from the power supply unit 87 which is generated with reference to the circuit ground GNDc.

The control unit 6 controls the DC to DC converter 4 and the load 5 which are connected directly to the control unit 6 and which are circuits to be controlled according to the communication signal Sr which are transmitted and inputted to the receiving terminal (Rx) thereof. This control makes a current Io flow through the DC to DC converter 4, as shown FIG. 1, and makes a voltage drop Vz (=Io×Z) occur in the impedance component 3. This voltage drop Vz varies according to the current Io, and becomes the potential difference between the vehicle body ground GNDb and the circuit ground GNDc. According to this potential difference, the circuit ground GNDc enters a state in which it is floating with respect to the vehicle body ground GNDb.

It can be considered that the above-mentioned potential difference affects the previously-explained operation of the comparator 71 which runs with reference to the circuit ground GNDc.

However, the voltage of the power supply Vcc1 (with reference to the circuit ground GNDc) for circuits which is supplied to the comparator 71 varies according to the current Io which flows through the impedance component 3, though the communication signal Si inputted to the noninverting input terminal (+) and the comparison reference signal Sf inputted to the inverting input terminal (−) run with reference to both the vehicle body ground GNDb and the battery power source 1, the comparison between the communication signal Si and the comparison reference signal Sf is not influenced by the potential difference which is caused by the impedance component 3. Therefore, the communication signal Sr which is the output of the comparator 71 and is transmitted to the receiving terminal (Rx) of the control unit 6 becomes stable, like the communication signal Si on the side of the vehicle body ground GNDb.

Furthermore, although the power supply voltage of the comparator 71 has a variation equivalent to the voltage drop Vz (i.e., the potential difference) which is caused by the impedance component 3 with respect to both the communication signal Si and the comparison reference signal Sf inputted to the comparator 71, because the comparator 71 runs from the relative voltage between the signal and the power supply as an in-phase voltage, if the speed of response of the comparator 71 is adequately high, the comparator 71 does not output any abnormal output at this relative voltage.

If the comparison reference signal Sf inputted to the inverting input terminal (−) of the comparator 71 were set up by a voltage which is obtained by dividing the difference between the voltage (at the positive electrode) of the battery power source 1 and the circuit ground GNDc by using resistors, the potential difference between the vehicle body ground GNDb and the circuit ground GNDc would vary with the voltage drop Vz (a potential difference) which occurs in the impedance component 3, and this would result in occurrence of a variation in the comparison reference signal Sf, and the comparator would erroneously determine the level of the communication signal Si from the vehicle-mounted unit 2. However, because the communication interface circuit generates the comparison reference signal Sf with reference to the vehicle body ground GNDb, the comparator does not make such erroneous determination.

Next, a hysteresis function of the above-mentioned hysteresis circuit will be explained with reference to FIG. 3.

Figure 3:
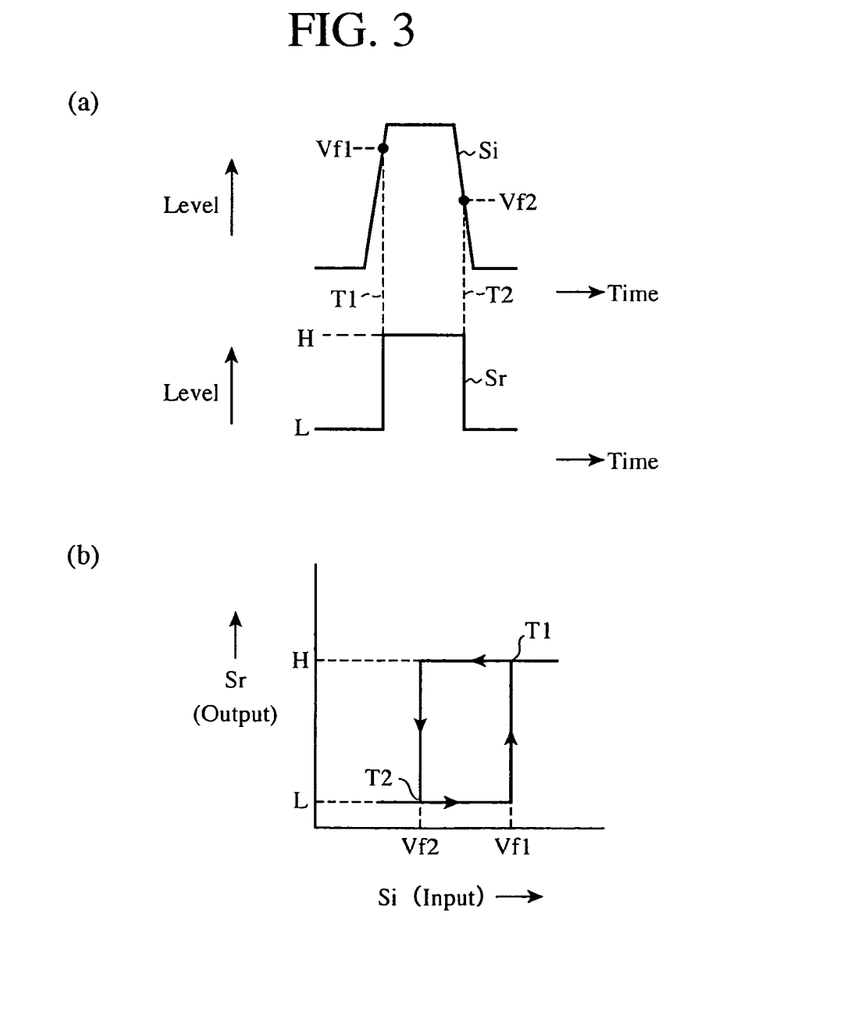

FIG. 3 is an explanatory drawing showing the hysteresis function, FIG. 3(a) is a diagram showing a timing relationship between the communication signal Si inputted to the comparator 71, and the communication signal Sr outputted from the comparator 71, and FIG. 3(b) is a diagram showing a hysteresis characteristic.

When the communication signal Si inputted to the noninverting input terminal (+) of the comparator 71 has a waveform which varies with time as shown in FIG. 3(a), the hysteresis circuit changes the level of the comparison reference signal Sf which is used as a criterion by which to determine whether the communication signal Si has a high (H) level or a low (L) level on both the rising and falling edges of the communication signal Si. This is the hysteresis function, and is effective in, for example, preventing erroneous determination from being made when noise is piggybacked onto the communication signal Si.

When the level of the comparison reference signal Sf on the rising edge of the communication signal Si is expressed as Vf1 and the level of the comparison reference signal Sf on the falling edge of the communication signal Si is expressed as Vf2, there is the following relation between these Vf1 and Vf2: Vf1>Vf2, as shown in FIG. 3(a). As a result, on the rising edge of the communication signal Si, the result of the determination of whether the communication signal Si has a high (H) level or a low (L) level is inverted according to whether the communication signal has a level exceeding the level of the comparison reference signal Sf=Vf1, and, when the communication signal has a level equal to or less than Vf1, the comparator determines that the communication signal has a low (L) level, whereas when the communication signal has a level greater than Vf1, the comparator determines that the communication signal has a high (H) level.

In contrast to this, on the falling edge of the communication signal Si, the result of the determination of whether the communication signal Si has a high (H) level or a low (L) level is inverted according to whether the communication signal has a level exceeding the level of the comparison reference signal Sf=Vf2, and, when the communication signal has a level greater than Vf2, the comparator determines that the communication signal has a high (H) level, whereas when the communication signal has a level equal to or less than Vf2, the comparator determines that the communication signal has a low (L) level. In this way, the timing at which the result of the determination of whether the communication signal Si has a high (H) level or a low (L) level is inverted differs between on the rising edge of the communication signal Si and on the falling edge of the communication signal Si, and the timing at which the result of the determination of whether the communication signal Si has a high (H) level or a low (L) level is inverted from high (H) to low (L) on the falling edge of the communication signal Si becomes later than that on the rising edge of the communication signal Si. The signal which is outputted from the comparator 71 according to this hysteresis function is the communication signal Sr as shown in FIG. 3(a).

The above-mentioned hysteresis function will be explained with reference to FIG. 3(b).

FIG. 3(b) is a diagram showing the hysteresis characteristic in which the horizontal axis shows the communication signal Si which is the input of the comparator 71, and the vertical axis shows the communication signal Sr which is the output of the comparator 71.

In this FIG. 3(b), when the communication signal Si rises as shown in FIG. 3(a), the communication signal Sr has a low (L) level in a state in which the communication signal has a level equal to or less than Vf1, and is then inverted from low (L) to high (H) at the timing T1 at which the communication signal Si has a level exceeding Vf1. After this timing T1 at which the communication signal Si has a level exceeding Vf1, the communication signal Si varies as shown in FIG. 3(a), and, while the communication signal Si then falls, but has a level exceeding Vf2, the communication signal Sr keeps its level at high (H) and is then inverted from high (H) to low (L) at the timing T2 at which the communication signal Si has a level equal to or less than Vf2 on the falling edge thereof. After that, the hysteresis circuit repeats this hysteresis operation.

The operation of the circuit which implements the hysteresis function explained above will be explained hereafter.

When the communication signal Si inputted to the noninverting input terminal (+) of the comparator 71 is in the low (L) state, the transistor 79 is turned off and therefore the comparison reference signal Sf inputted to the inverting input terminal (−) of the comparator has a divided voltage (=Vf1) which is generated by the resistors 72 and 73. As mentioned above, the communication signal Sr which the comparator 71 outputs has a low (L) level when the communication signal Si has a level equal to or less than Vf1, whereas the communication signal Sr has a high (H) level when the communication signal Si a level exceeding Vf1.

When the level of the communication signal Sr becomes high (H), the potential of the emitter (E) of the transistor 74 of the first constant current signal generation circuit 7A rises and the transistor is then turned on. The voltage of the base (B) of this transistor 74 is set up by the resistors 77 and 78 in such a way that the transistor is turned on when the emitter (E) has a high (H) level.

When the above-mentioned transistor 74 is turned on, the constant current signal Ic1 flows through the collector (C) of the transistor. Although the first constant current signal generation circuit 7A which is formed of this transistor 74 and so on runs with reference to the circuit ground GNDc, the circuit ground GNDc has a potential difference with respect to the vehicle body ground GNDb because of the impedance component 3, as mentioned above, and therefore the first constant current signal generation circuit is influenced by this potential difference. However, in the structure of FIG. 1, even if the potential difference occurs between the circuit ground GNDc and the vehicle body ground, a relation in voltage between this circuit ground GNDc and the power supply Vcc2 for circuits of the power supply unit 87 does not change. Therefore, the potentials of the base (B) and emitter (E) of the transistor 74 and that of the output end of the comparator 71 are not influenced by the above-mentioned potential difference. As a result, the voltage between the both ends of the resistor 76 (R76) becomes fixed regardless of the above-mentioned potential difference, and the constant current Ic1 (the voltage between the both ends of R76/R76) flows through the collector (C) of the transistor 74. The potential difference which occurs between the vehicle body ground GNDb and the circuit ground GNDc due to the impedance component 3 has an influence upon the first constant current signal generation circuit as a voltage variation between the collector (C) and emitter (E) of the transistor 74, and the potential difference is absorbed (cancelled) by this voltage variation.

The above-mentioned constant current signal Ic1 flows into the base (B) of the transistor 79 which forms the hysteresis circuit. Because of the inflow of this constant current signal Ic1, the transistor 79 is turned on with stability without being influenced by the potential difference which occurs between the vehicle body ground GNDb and the circuit ground GNDc, and reduces the voltage of the comparison reference signal Sf inputted to the inverting input terminal (−) of the comparator 71 via the resistor 80.

This state in which the voltage is reduced becomes a state of the comparison reference signal Sf=Vf2, and then becomes a state exhibiting the hysteresis characteristic. Furthermore, because the transistor 79 of the hysteresis circuit is driven with a constant current and runs with reference to the vehicle body ground GNDb, the stable hysteresis characteristic can be provided without being influenced by the potential difference which occurs between the vehicle body ground GNDb and the circuit ground GNDc.

The hysteresis circuit determines whether the communication signal has a high (H) level or a low (L) level, as mentioned above, according to this hysteresis characteristic.

Next, an operation of transmitting a signal from the control unit 6 to the vehicle-mounted unit 2 will be explained.

The control unit 6 which runs with reference to the circuit ground GNDc outputs a communication signal St in a digital form which is to be transmitted to the vehicle-mounted unit 2 via the transmitting terminal (Tx) thereof. The voltage of this communication signal St is divided by the resistors 83 and 84 which form the second constant current signal generation circuit 7B, and the communication signal is then inputted to the base (B) of the transistor 81.

When the communication signal St inputted to the base (B) has a high (H) level, this transistor 81 is turned off, whereas when the communication signal St has a low (L) level, the transistor 81 is turned on. Operation settings are performed on this transistor with the resistor 82 disposed on the side of the emitter (E) and the resistors 83 and 84 disposed on the side of the base in such a way that the transistor is turned on or off in the above-mentioned way.

When the above-mentioned transistor 81 is turned on by the low (L) state of the communication signal St, the constant current signal Ic2 flows through the collector (C). The second constant current signal generation circuit 7B which is formed of this transistor 81 and so on runs with reference to the circuit ground GNDc, and is influenced by the potential difference which occurs between the vehicle body ground GNDb and the circuit ground GNDc due to the impedance component 3, like the above-mentioned first constant current signal generation circuit 7A.

However, as mentioned in the explanation of the first constant current signal generation circuit 7A, a relation in voltage between the circuit ground GNDc and the power supply Vcc2 for circuits of the power supply unit 87 does not change. Therefore, the potentials of the base (B) and emitter (E) of the transistor 81 are not influenced by the above-mentioned potential difference. As a result, the voltage between the both ends of the resistor 82 (R82) becomes fixed regardless of the above-mentioned potential difference, and the constant current Ic2 (the voltage between the both ends of R82/R82) flows through the collector (C) of the transistor 81.

Like in the case of the above-mentioned transistor 74, the potential difference which occurs between the above-mentioned vehicle body ground GNDb and the circuit ground GNDc has an influence upon the second constant current signal generation circuit as a voltage variation between the collector (C) and emitter (E) of the transistor 81, and the potential difference is absorbed (cancelled) by this voltage variation.

The above-mentioned constant current signal Ic2 which flows when the communication signal St has a low (L) level flows into the base (B) of the transistor 85 which forms the signal output circuit. Because of the inflow of this constant current signal Ic2, the transistor 85 is turned on with stability without being influenced by the potential difference which occurs between the vehicle body ground GNDb and the circuit ground GNDc, and the collector of the transistor has the same potential as the emitter (E), i.e., the potential of the vehicle body ground GNDb. The potential of this vehicle body ground GNDb is a low (L) level, and the communication signal So having the same low (L) level corresponding to the communication signal St is transmitted from the transistor 85 to the vehicle-mounted unit 2 by way of the communication line 8.

In contrast to this, when the communication signal St inputted to the base (B) of the transistor 81 has a high (H)

level, the transistor 81 is turned off and therefore the constant current signal Ic2 is not generated. As a result, because the base (B) current does not flow, the transistor 85 which forms the signal output circuit changes to its off state and the collector of the transistor 85 has a high (H) level. The communication signal So having the same high (H) level corresponding to the communication signal St is transmitted from the transistor 85 to the vehicle-mounted unit 2 byway of the communication line 8. In this way, the communication signal So which is the same as the communication signal Sr which the control unit 6 outputs is transmitted to the vehicle-mounted unit 2.

As previously explained, when the communication signal St which the control unit 6 outputs has a low (L) level, the transistor 85 which forms the signal output circuit is driven with a constant current and is turned on, whereas when the communication signal St has a high (H) level, the transistor 85 is turned off because no current flows into the base (B) thereof, and the transistor 85 runs with reference to the vehicle body ground GNDb. Therefore, the signal output circuit transmits the stable communication signal So with reference to the vehicle body ground GNDb to the vehicle-mounted unit 2 without being influenced by the potential difference which occurs between the vehicle body ground GNDb and the circuit ground GNDc.

If the emitter (E) of the transistor 85 were connected to the circuit ground GNDc, there is a possibility that the voltage drop Vz which occurs in the impedance 3 would be piggybacked onto the communication signal So having a low (L) level which is outputted from the transistor 85, and the vehicle-mounted unit 2 which receives this communication signal So would carry out erroneous determination. However, because the above-mentioned emitter (E) of the transistor 85 is actually connected to the vehicle body ground GNDb, the vehicle-mounted unit does not carry out any erroneous determination.

As mentioned above, the equipment for vehicle in accordance with this Embodiment 1 is constructed in such a way that the control unit 6 is placed on the side of the DC to DC converter 4 which runs with reference to the circuit ground GNDc and which is an object to be controlled, the control unit 6 and the DC to DC converter 4 are connected directly to each other, and the communication interface circuit 7 is placed between the control unit 6 which runs with reference to the circuit ground GNDc and the vehicle-mounted unit 2 which runs with reference to the vehicle body ground GNDb, and is so constructed as to carry out bidirectional communications between the vehicle-mounted unit 2 and the control unit 6 in such a way that the potential difference which occurs between the vehicle body ground GNDb and the circuit ground GNDc due to the impedance component 3 is cancelled. Therefore, in a case in which the control unit 6 controls the DC to DC converter 4 which is an object to be controlled by using a plurality of signal lines (e.g., signal lines 6a to 6d), the number of components included in the communication interface circuit 7 can be reduced, and this results in downsizing and cost reduction of the equipment for vehicle.

Furthermore, the communication interface circuit 7 having a small number of components can absorb the influence of the potential difference which occurs between the vehicle body ground GNDb and the circuit ground GNDc due to the impedance component, and can carry out bidirectional communications by way of the single communication line 8.

In addition, the comparator 71 is disposed as the input component of the communication interface circuit 7, and this comparator 71 is constructed in such a way as to run from the power supply Vcc1 for circuits which is generated with reference to the circuit ground GNDc, receive the communication signal Si and the comparison reference signal Sf which are generated with reference to the vehicle body ground GNDb at the noninverting input terminal (+) and the inverting input terminal (−) thereof, respectively, compare the communication signals Si with the comparison reference signal Sf to determine whether the communication signal Si has a high level or a low level, and output the communication signal Sr based on this determination to the control unit 6. Therefore, even if the voltage of the above-mentioned power supply Vcc1 for circuits varies under the influence of the potential difference which occurs between the vehicle body ground GNDb and the circuit ground GNDc, the communication signal Si and the comparison reference signal Sf inputted to the comparator run with reference to the vehicle body ground GNDb, and therefore the comparison between the communication signal Si and the comparison reference signal Sf is not influenced by the potential difference which occurs between the vehicle body ground GNDb and the circuit ground GNDc. As a result, the communication signal Sr which the comparator 71 outputs can be made to become stable, like the communication signal Si on the side of the vehicle body ground GNDb.

Furthermore, the above-mentioned comparator 71 includes the first constant current signal generation circuit 7A formed of the transistor 74 and so on, which runs with reference to the circuit ground GNDc, and the hysteresis circuit formed of the transistor 79 and so on, which, when the constant current signal Ic1 from the transistor 74 flows thereinto, runs with reference to the vehicle body ground GNDb and reduces the level of the comparison reference signal Sf which is inputted to the comparator 71. Therefore, the transistor 79 is driven by the constant current signal Ic1 which is not related to the potential difference which occurs between the vehicle body ground GNDb and the circuit ground GNDc, and the hysteresis circuit can exhibit the hysteresis characteristic with stability.

In addition, this hysteresis function can prevent the comparator 71 from making erroneous determination when noise is piggybacked onto the communication signal Si from the vehicle-mounted unit 2, thereby making the communication signal Sr which the comparator 71 outputs have a high degree of precision.

Furthermore, the equipment for vehicle includes the second constant current signal generation circuit 7B formed of the transistor 81 and so on, which runs with reference to the circuit ground GNDc, and the signal output circuit formed of the transistor 85 and so on, which, when the constant current signal Ic2 from the transistor 81 flows thereinto, runs with reference to the vehicle body ground GNDb and transmits the same communication signal So corresponding to the communication signal St outputted by the control unit 6 to the vehicle-mounted unit 2. Therefore, the transistor 85 is driven by the constant current signal Ic2 which is not related to the potential difference which occurs between the vehicle body ground GNDb and the circuit ground GNDc, and the stable communication signal So can be transmitted to the vehicle-mounted unit 2.

INDUSTRIAL APPLICABILITY

As mentioned above, because the equipment for vehicle and the communication interface circuit in accordance with the present invention are constructed in such a way as to carry out bidirectional communications between the vehicle-mounted unit and the control unit, the number of components included in the communication interface circuit is reduced so that the equipment for vehicle and the communication interface circuit are downsized and reduced in cost, the equipment for vehicle and the communication interface circuit are suitable for use in equipment for vehicle (e.g., a discharge lamp lighting device) in which the number of lines connected to an object to be controlled which is controlled by the control unit is larger than the number of communication lines (typically, only one communication line) connected between the vehicle-mounted unit and the control unit.

The invention claimed is:

1. Equipment for vehicle comprising:
a vehicle-mounted unit which runs with respect to a vehicle body ground to which a negative electrode of a battery power source is connected, for transmitting and receiving a communication signal in a digital form;
an impedance component having an end which is connected to said vehicle body ground, and another end which is connected to a circuit ground;
a circuit to be controlled which runs with respect to said circuit ground;
a control unit which runs with respect to said circuit ground, for controlling said circuit to be controlled, and for outputting a communication signal in a digital form which is to be transmitted to said vehicle-mounted unit;
a communication interface circuit which runs with respect to both said vehicle body ground and said circuit ground, for cancelling a potential difference which occurs between said vehicle body ground and said circuit ground due to a flow of a current which flows through said circuit to be controlled into said impedance component, and for carrying out bidirectional communications of said communication signal between said vehicle-mounted unit and said control unit.

2. The equipment for vehicle according to claim 1, characterized in comprising, as an input component of the communication interface circuit, a comparator which runs with respect to the circuit ground in such a way as to receive a communication signal which is generated with respect to the vehicle body ground from the vehicle-mounted unit, and a comparison reference signal which is generated with respect to said vehicle body ground, compare said communication signal with said comparison reference signal so as to determine whether said communication signal has a high level or a low level, and output a signal based on said determination to the control unit.

3. The equipment for vehicle according to claim 2, characterized in comprising a first constant current signal generation circuit when runs with respect to the circuit ground and which generates a constant current signal when the comparator outputs the signal, and a hysteresis circuit which runs with respect to the vehicle body ground and changes a level of the comparison reference signal inputted to the comparator when the constant current signal from said first constant current signal generation circuit flows thereinto.

4. The equipment for vehicle according to claim 1, characterized in comprising a second constant current signal generation circuit which runs with respect to the circuit ground and which generates a constant current signal from the communication signal outputted by the control unit, and a signal output circuit which runs with respect to the vehicle body ground and transmits a signal corresponding to the communication signal outputted by said control unit to the vehicle-mounted unit when the constant current signal from said second constant current signal generation circuit flows thereinto.

5. A communication interface circuit for use in equipment for vehicle including a vehicle-mounted unit which runs with respect to a vehicle body ground to which a negative electrode of a battery power source is connected, for transmitting and receiving a communication signal in a digital form, an impedance component having an end which is connected to said vehicle body ground, and another end which is connected to a circuit ground, and a control unit which runs with respect to said circuit ground, for controlling a circuit to be controlled, and for outputting a communication signal in a digital form which is to be transmitted to said vehicle-mounted unit, said communication interface circuit comprising:
a comparator which runs with respect to said circuit ground, which receives a communication signal which is generated with respect to said vehicle body ground which is transmitted from said vehicle-mounted unit at a noninverting input end thereof, and receives a comparison reference signal which is generated with respect to said vehicle body ground at an inverting input end thereof, which compares said communication signal with said comparison reference signal to determine whether said communication signal has a high level or a low level, and which outputs a signal based on this determination to said control unit;
a first constant current signal generation circuit which runs with respect to said circuit ground, and which generates a constant current signal when said comparator outputs a high-level signal;
a hysteresis circuit which runs with respect to said vehicle body ground and reduces a level of the comparison reference signal inputted to said comparator when the constant current signal from said first constant current signal generation circuit flows thereinto;
a second constant current signal generation circuit which runs with respect to said circuit ground and which generates a constant current signal from the communication signal outputted by said control unit; and
a signal output circuit which runs with respect to said vehicle body ground and transmits a same signal corresponding to the communication signal outputted by said control unit to the vehicle-mounted unit when the constant current signal from said second constant current signal generation circuit flows thereinto.

* * * * *